April 4, 1961 W. M. MORDICK ET AL 2,977,894
LINKED POWER CHAIN FOR CONVEYORS
Filed Nov. 12, 1958 3 Sheets-Sheet 1

INVENTORS:
WILLIAM M. MORDICK
and LOREN W. LERCH
BY:
Beau, Brooke, Buckley & Beau,
ATTORNEYS.

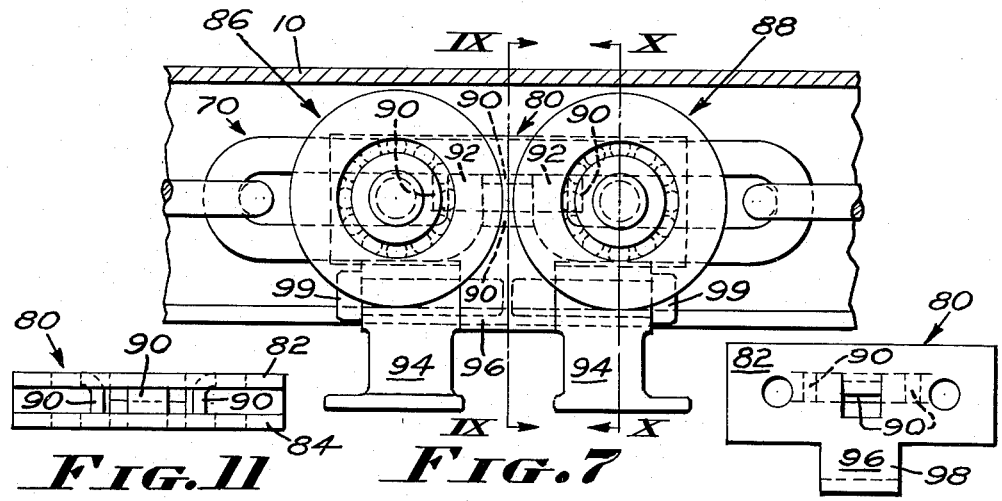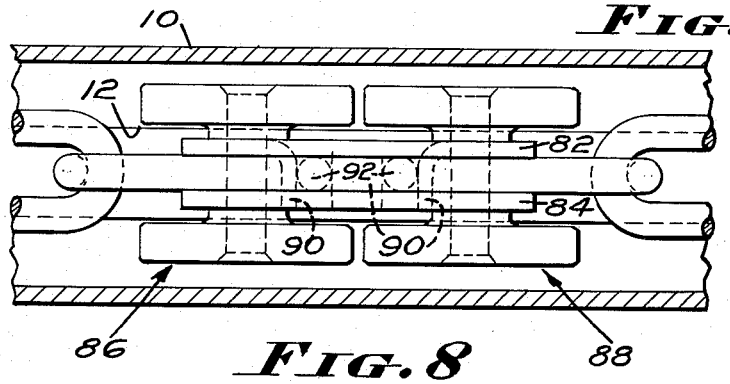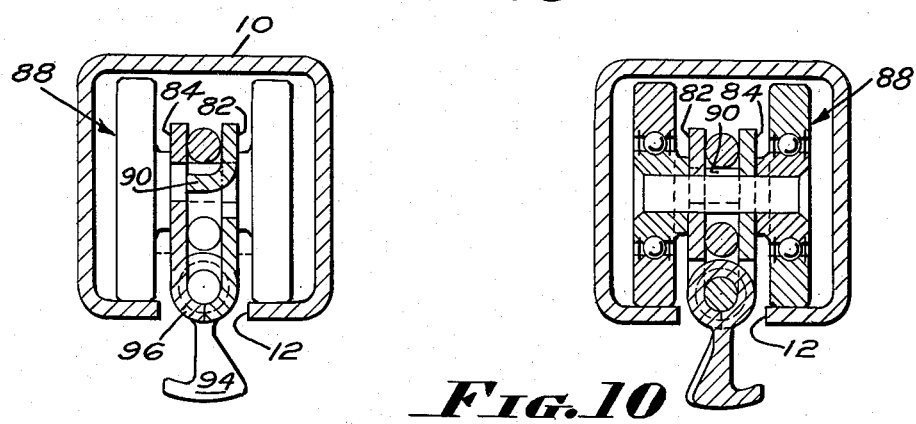

April 4, 1961   W. M. MORDICK ET AL   2,977,894
LINKED POWER CHAIN FOR CONVEYORS
Filed Nov. 12, 1958   3 Sheets-Sheet 3

INVENTORS:
WILLIAM M. MORDICK
and LOREN W. LERCH
BY:
Beau, Brooks, Buckley & Beau,
ATTORNEYS.

United States Patent Office

2,977,894
LINKED POWER CHAIN FOR CONVEYORS

William M. Mordick, North Tonawanda, and Loren W. Lerch, Buffalo, N.Y., assignors to Columbus McKinnon Chain Corporation, Tonawanda, N.Y.

Filed Nov. 12, 1958, Ser. No. 773,276

4 Claims. (Cl. 104—172)

This invention relates to chain powered conveyors in which power chains are provided with load pick-up or carrying means for moving hangers, trucks or other objects along trolley rails, tracks, floorways, or the like for example as in manufacturing or warehousing operations. The power chains referred to include wheeled drive links and guide links alternately disposed in vertical and horizontal attitudes to guide the chain in its travel along the track system.

One object of the present invention is to provide an improved conveyor power chain for use in conveyor systems as aforesaid.

Another object is to provide an improved chain as aforesaid which is economical to manufacture, and which is readily assembled to provide a durable power chain and conveying unit.

Other objects and advantages of the invention will become apparent from the following specification, wherein the drawing illustrates various forms of the invention, and in which:

Fig. 7 is a fragmentary side elevational view of a power chain load pick-up unit showing still another form of construction of the invention;

Fig. 8 is a top plan view of the construction of Fig. 7;

Fig. 9 is a sectional view taken on line IX—IX of Fig. 7;

Fig. 10 is a section taken on line X—X of Fig. 7;

Fig. 11 is a top plan view of a bracket component of the construction of Figs. 7–10;

Fig. 12 is a side elevational view of the bracket of Fig. 11;

Figure 1:
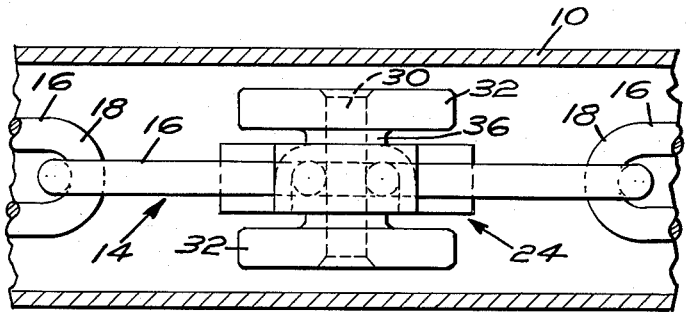
Fig. 1 is a fragmentary top plan view of a conveyor power chain illustrating the invention.

Conveying systems of the type to which this invention relates include flexible power chains running in either overhead or underground trackways having load pick-up means extending from the trackway to engage load carrying racks, dollies, trolleys, or the like. For example, as shown herein the power chain supporting track is indicated at 10 to be of box-shaped cross section with the bottom wall thereof slotted as indicated at 12, so that the trackway is adapted for overhead conveyor use. However, the slot may be in the top or in either side wall of the track member, depending upon the relative position of the power chain and the work to be conveyed.

The power chain is made up of wheeled links having their wheels alternately disposed in vertical and horizontal attitudes to rollingly support and guide the chain vertically and horizontally in its travel through the track channels. Load pick-up units are interspersed throughout the length of the chain at required intervals. When the conveyor is being used in overhead relation to the workload, as illustrated for example in the accompanying drawings, the pick-up units will replace vertical guide links; giving the chain the same vertical support and guide action.

As illustrated in Figures 1–4 the power chain link of the invention comprises a bent wire member designated generally at 14 which includes a main strand portion 16 leading into vertically bent end portions 18 which in turn lead into return portions 20, each of which terminates in an inturned end portion 22. It will be noted that the reversely bent end portions 18—18 form loops to provide means for articulated connection with adjacent links of the power chain.

A two-piece clamping bracket designated generally at 24, composed of a receiving section 26 and a closure plate 28 is mounted on the link unit, and the receiving section 26 is so shaped and designed as to embrace the portions of the bent wire member occupying approximately the central third thereof in such manner that when the two bracket portions are positioned and fixed in place the bent wire member will be rigidly retained in the desired shape even though subjected to the substantial stresses encountered in use. As seen best in Figs. 2 and 3, a space is left between the two inturned portions of the bent wire member and both portions of the clamping brackets are centrally apertured. Thus mounting means is provided for axle 30 which in turn mounts a pair of wheels 32—32.

Figure 3:
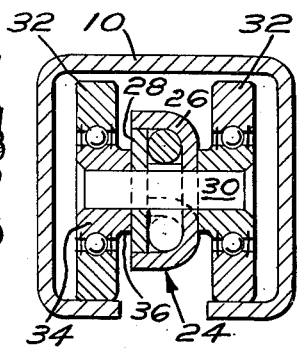
Fig. 3 is a sectional view taken on line III—III of Fig. 2.
Figure 2:
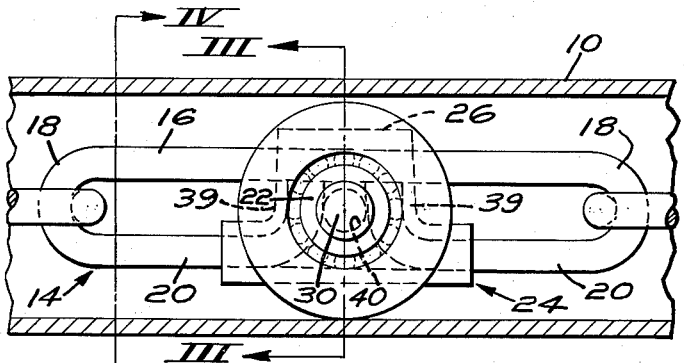
Fig. 2 is a fragmentary side elevational view of the chain of Fig. 1.
Figure 4:
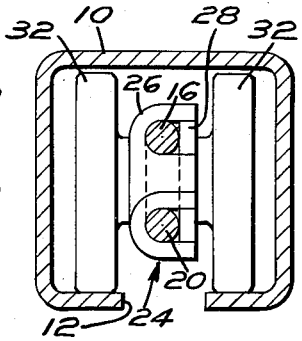
Fig. 4 is a sectional view taken along line IV—IV of Fig. 2.

As best seen in Fig. 3 the wheels 32 are of the ball-bearing type and the inner race portions 34—34 are formed with shouldered projections 36—36, which bear against the bracket 24 and prevent binding of the wheels. Although the portions 26—28 of the clamping bracket may be fastened together by any preferred means such as by spot welding, it is not necessary because when the several components of the power chain link are placed in assembled relation and the wheels 32—32 are firmly fastened in place as by riveting the ends of the wheel axles as shown, or by other means such as by using bolts for the wheel axles, the entire link assembly will be held in a firmly locked condition.

Figure 4A:
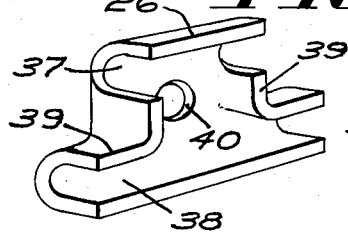
Fig. 4a is a perspective view of a component of the construction of Figs. 1–3.
Figure 13:
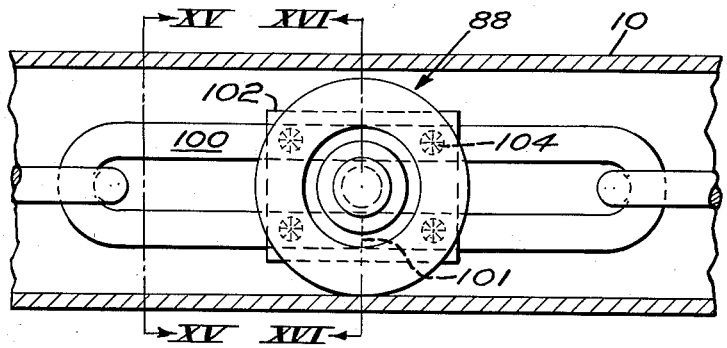
Fig. 13 is a side elevational view of another form of chain guide link of the invention.
Figure 14:
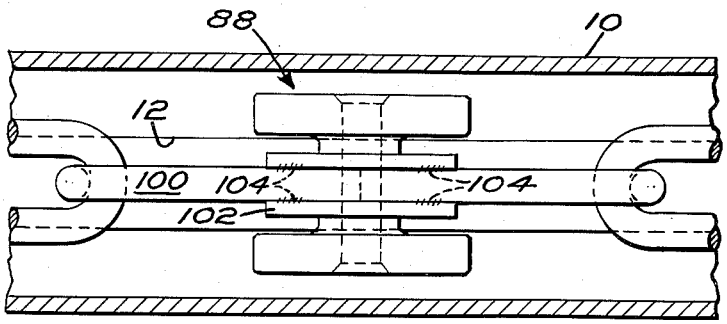
Fig. 14 is a top plan view taken of the construction of Fig. 13.
Figure 15:
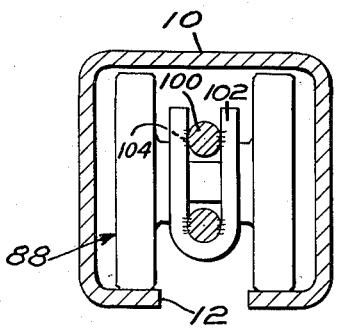
Fig. 15 is a sectional view taken on line XV—XV of Fig. 13.
Figure 16:
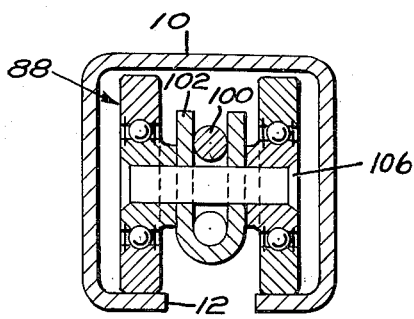
Fig. 16 is a sectional view taken on line XVI—XVI of Fig. 13.

More specifically, as shown in Fig. 4a, the receiving portion 26 of the bracket 24 comprises a metal piece pressed to provide a channel portion 37 which receives the link strand 16 and a second channel portion 38 which receives the ends of the return portions 20—20 of the links. The bracket 26 also includes upright cheek flanges 39—39 which confine therebetween the inturned ends 22—22 of the bent wire 14. The bracket piece 26 is apertured as at 40 to accommodate the axle 30 as explained hereinabove. The closure portion 28 of the bracket 24 is a flat piece of metal shaped to complement the open face of the receiving portion 26 and interfit therewith as seen in Fig. 3.

Figure 5:
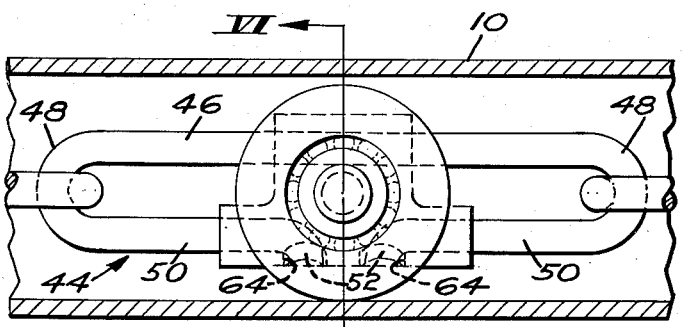
Fig. 5 is a fragmentary side elevational view, showing another form of a power chain guide link of the invention.
Figure 6:
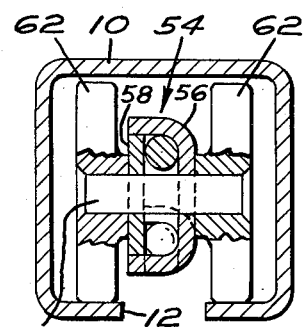
Fig. 6 is a sectional view taken on line VI—VI of Fig. 5.

In Figs. 5 and 6, a modified form of the invention is illustrated to comprise a bent wire member 44 having reverse bent end portions 48—48, and return strand portions 50—50 leading into outwardly bent portions 52—52. A clamping bracket 54 comprising, as in the case of Figs. 1–4, a receiving member 56 and a closure member 58 is provided to clampingly engage the bent wire member 46 and provides mounting means for an axle 60 and wheels 62—62. The clamping bracket 54 is generally similar to the clamping bracket 24 described hereinabove, but the receiving portion thereof is notched at its lower edge as indicated at 64—64 to receive the outturned portions 52—52 of the bent wire member 44. Thus, the free ends of the bent wire member 44 are firmly locked into the bracket device so as to thereby enable the bent wire member 44 to withstand the end loads thereon incidental to the power chain use.

Another form of the bracket of the invention is illustrated in Figs. 7–12 wherein the bent wire member 70 is substantially of the same configuration as the member 16 described in conjunction with Figs. 1–4, but utilizes a clamping bracket member which adapts the link for mounting a pair of wheels such as might be desired when the particular link is to be used as a driving or pick-up link. As illustrated the clamping bracket 80 is generally similar in nature to the clamping bracket 24 described hereinabove, but is formed of one piece and is bent into a U-shape with upwardly extending side wall portions 82—84. The bracket 80 is apertured at each end thereof so that a pair of wheel and axle assemblies designated generally at 86—88 may be accommodated. Additionally tabs 90 are formed from the upstanding walls 82 and bent inwardly to span the space between the respective upstanding walls and are positioned to confine the inturned end portions of the bent wire member.

It will be evident, that as in the first form of the invention described hereinabove, mounting the wheel assemblies 86—88 on the clamping bracket 80 and bent wire member 70 will serve to lock the entire assembly into a strong unified power chain link.

For purposes of mounting load engaging means such as the dogs designated 94—94, the clamping bracket is dimensioned so as to extend below the bent wire member and material is removed from the lower end portion of the bracket at each end thereof as indicated at 98. Thus the bracket 80 is formed with an eye portion 96 to which the dogs 94—94 may be mounted by means of pins 99—99.

In the form of the invention illustrated by Figs. 13–16, a conventional link member 100 may be welded at the point where ends of the rod abut, as designated at 101. A U-shaped mounting bracket 102, dimensioned to closely fit the link member is positioned thereon and welded thereto as indicated at 104, thus forming a strong mounting bracket and link assembly. Both walls of the U-sectioned brackets are apertured centrally to mount the wheel and axle assembly, designated at 106, in the same manner as described hereinabove. Thus it will be appreciated that the power chain components described herein are easily and inexpensively fabricated and result in a strong power chain link.

Although only a few forms of the invention have been illustrated and described hereinabove, it will be understood that the invention is not so limited, but that various changes may be made therein without departing from the spirit of the invention or the scope of the appended claims.

We claim:

1. A conveyor power chain link comprising a wire member, said member being bent so as to form loop portions at opposite ends thereof and having the wire ends thereof terminating in abruptly curved portions adjacent the center of said link, a clamping bracket embracing said member at the central portion thereof, said bracket being shaped to complement and clamp upon the central portions of said link including said abruptly bent end portions and thereby holding said link against deformation, said bracket being centrally apertured and mounting therein a wheel axle, wheel means mounted on said axle, said axle being headed at both ends thereby maintaining said wheel means and said wire member and said bracket member in relative assembly.

2. A conveyor power chain link unit comprising a wire member, said member being bent so as to form loop portions at opposite ends thereof and having the wire ends terminating in longitudinally spaced inturned curved portions symmetrical of the center of said link, a clamping bracket embracing said member, said bracket being shaped to complement the central portion of said member including the curved portions of said member thereby holding said member against deformation, said bracket being apertured and mounting therein a wheel axle, wheel means mounted on said axle, said axle being headed at both ends thereby maintaining said unit in relative assembly.

3. A conveyor power chain link comprising a wire member, said member being bent so as to form loop portions at opposite ends thereof and having the wire ends thereof terminating in abruptly curved portions adjacent the center of said link, a clamping bracket embracing said member at the central portion thereof, said bracket being shaped to embrace the curved portions of said wire member thereby holding said member against deformation, said bracket being apertured and mounting therein a wheel axle, and wheel means mounted on said axle.

4. A conveyor power chain link unit comprising a wire member, said member being bent so as to form a chain link including loop portions at opposite ends of one solid leg portion thereof and having the wire ends defining the other leg portion thereof and terminating at the center of said link, a generally U-shaped clamping bracket embracing said member and having its bight portion shaped to complement and embrace the wire end portions of said member and welded thereto and its arm portions embracing said solid leg portion of the wire member and welded thereto, said bracket being apertured and mounting therein a wheel axle, and wheel means mounted on said axle.

References Cited in the file of this patent

FOREIGN PATENTS 738,491     Germany _____ Aug. 18, 1943